Feb. 6, 1923.
W. A. PETTEYS.
VEHICLE UNLOADING APPARATUS.
FILED MAY 20, 1921.

Patented Feb. 6, 1923.

1,444,704

UNITED STATES PATENT OFFICE.

WILLARD A. PETTEYS, OF LINCOLN, NEBRASKA.

VEHICLE-UNLOADING APPARATUS.

Application filed May 20, 1921. Serial No. 471,134.

*To all whom it may concern:*

Be it known that I, WILLARD A. PETTEYS, a citizen of the United States, residing at Lincoln, in the county of Lancaster and State of Nebraska, have invented certain new and useful Improvements in Vehicle-Unloading Apparatus, of which the following is a specification.

This invention appertains to an unloading apparatus or mechanism, and more particularly to a type of the same adapted for the unloading of vehicles, especially motor truck types of such vehicles.

The principal object of the invention is to provide for an apparatus or mechanism of the character mentioned, and one particularly designed to facilitate the unloading of non-dumping vehicles, and more especially non-dumping types of motor vehicles.

Another object of the invention is to provide for an unloading apparatus or mechanism of the type specified, and one particularly adapted for the unloading of motor vehicles of a non-dumping type, and wherein the motor power of the motor vehicle is utilized for the operation of the unloading mechanism.

A further object of the invention is to provide for an unloading apparatus or mechanism of the class set forth, and one wherein, in addition to the provision for the operation of the unloading mechanism from the driven wheels of a motor vehicle to be unloaded, provision is also made for the application of power to the mechanism from a source other than that of the truck to be unloaded, whereby vehicles, other than power driven types of the same, may be unloaded with equal facility.

With the foregoing and other objects in view, the invention resides in the certain novel and useful construction and arrangement of parts as will be hereinafter more fully described, set forth in the appended claims, and illustrated in the accompanying drawings, in which:—

Fig. 5 is a rear end elevation,
Fig. 8 is a fragmentary plan view, partly in section, of the upper and outer end portion of the unloading elevator, showing the manner of adjusting the slats in the endless belt or chain conveyor thereof, Fig. 10 is a fragmentary vertical section taken on the line 10—10 of Fig. 3, and,
Fig. 11 is a fragmentary vertical section taken on the line 11—11 of Fig. 3.

Figures 3, 9:
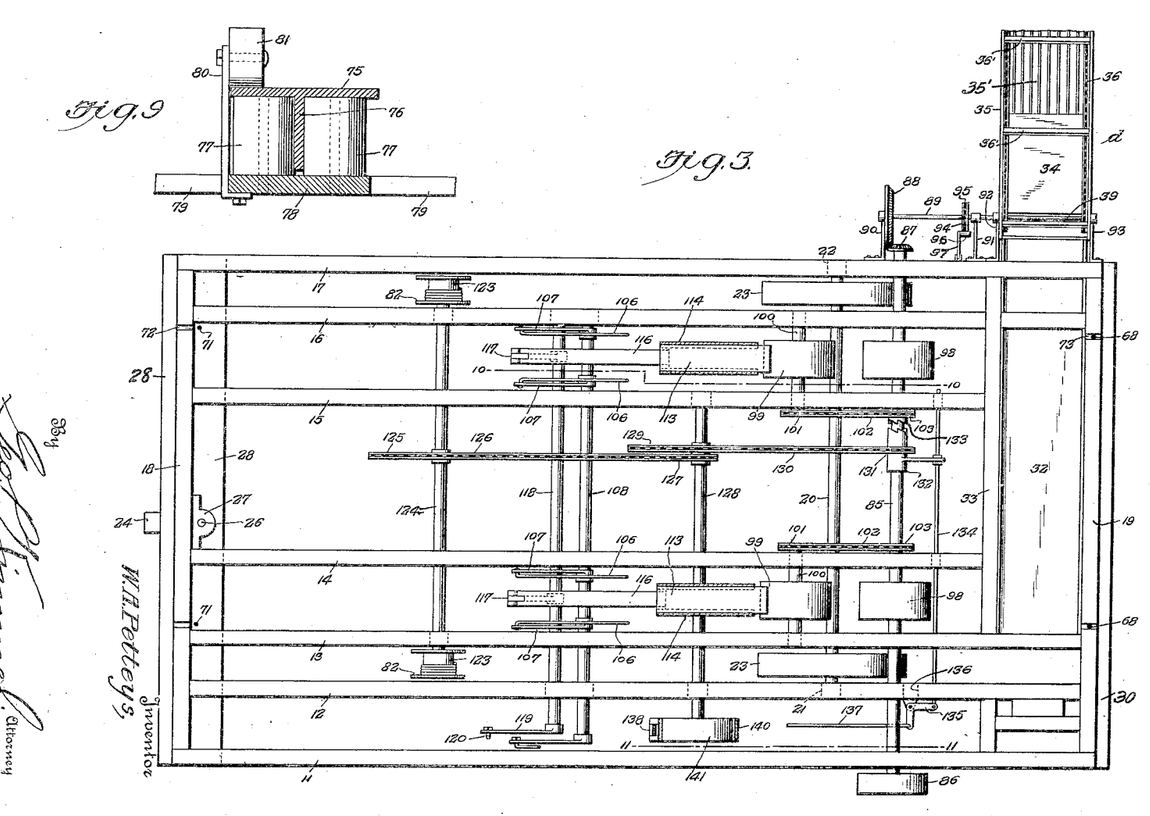
Fig. 3 is a top plan view of the power transmission mechanism and the supporting frame thereof with the vehicle runways of supporting platform removed therefrom.
Fig. 9 is a transverse section taken on the line 9—9 of Fig. 5.
Figures 3, 4:
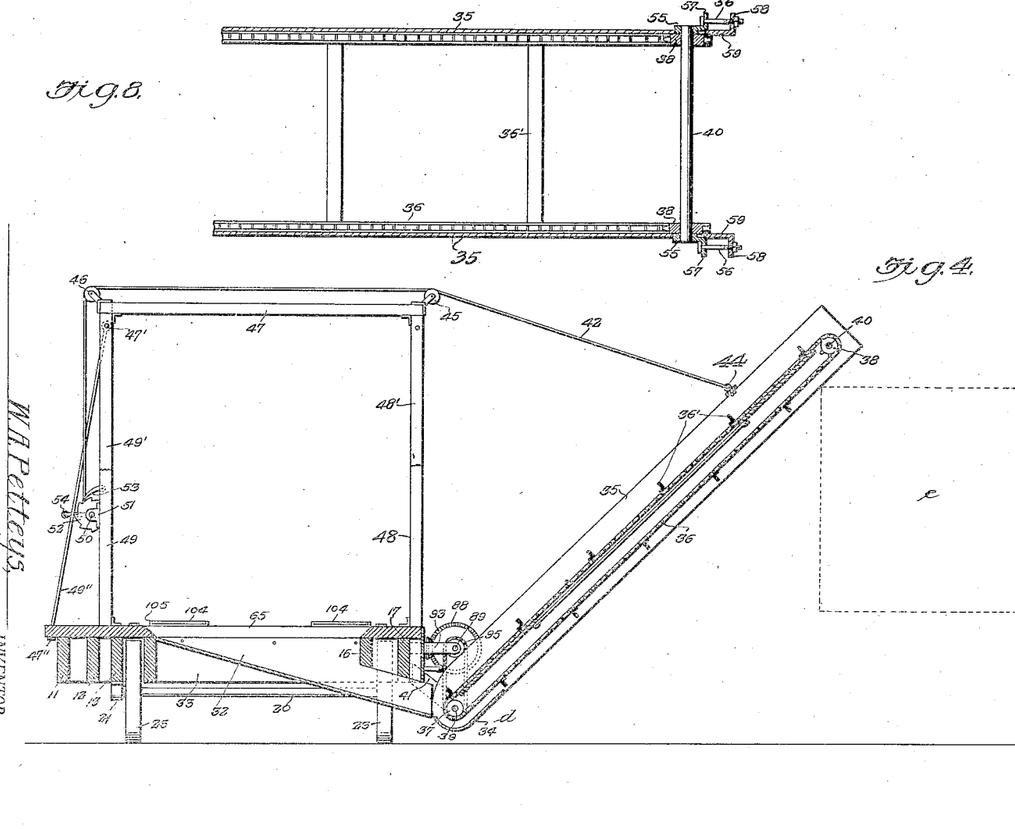
Fig. 4 is a front end elevation,

Referring to the drawings, wherein similar characters of reference designate corresponding parts in the several views thereof, the apparatus comprises generally an unloading platform *a*, having oppositely disposed runways *b* and *c* leading to and from the opposite ends thereof for the travel thereon of the vehicles or trucks to be unloaded; a conveyor mechanism *d* at the forward or front end of the platform *a* and arranged to receive the material to be dumped from the rear ends of the vehicles or trucks, when the same are properly positioned on the platform *a*, and to deliver the material laterally of the latter and discharge the same into receptacles, storage bins, or freight cars and the like, as shown in dotted lines at *e* in Fig. 4; and a vehicle or truck end raising and lowering elevator or platform *f* disposed at the end of the platform *a*, opposite to that carrying the conveyor mechanism *d*, the latter being adapted for use in the dumping of material from ordinary forms of non-dumping motor trucks, trailer trucks, and other forms of vehicles only.

Figures 1, 6, 7:
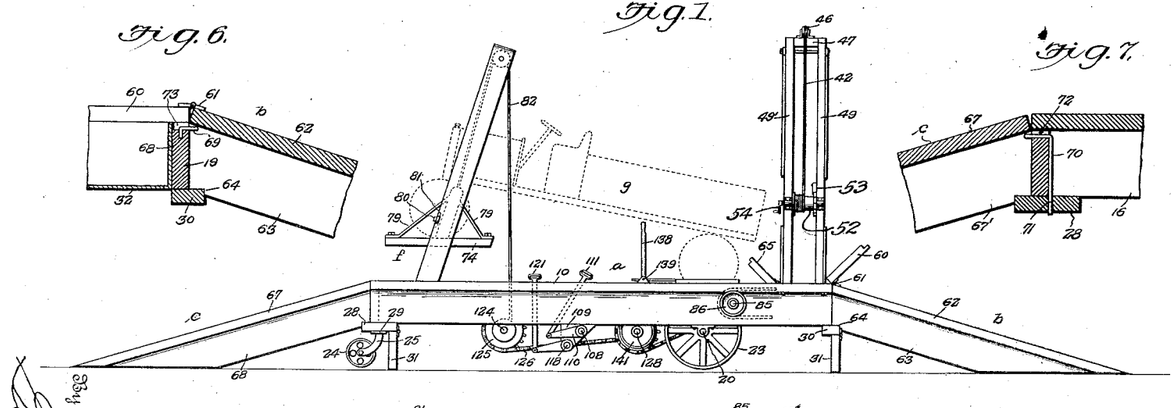
Figure 1 is a side elevation of the preferred embodiment of the apparatus or mechanism,
Fig. 6 is a fragmentary vertical section taken on the line 6—6 of Fig. 2.
Fig. 7 is a fragmentary vertical section taken on the line 7—7 of Fig. 2,

The unloading platform *a* comprises a flooring 10 laid and secured on a framework consisting of a plurality of longitudinally extending timbers, or joists 11, 12, 13, 14, 15, 16 and 17, one spaced from the other, and oppositely disposed end timbers or joists 18 and 19 connecting the ends of the several longitudinally extending timbers or joists, substantially as is shown in Fig. 3. Extending transversely of the frame inwardly of the front ends thereof, is an axle 20 having its opposite ends journaled in bearings 21 and 22 secured on the under faces of the longitudinally extending timbers or joists 12 and 17, respectively. Carried on the opposite end portions of the axle 20, between the timbers or joists 12, 13, and 16, 17, respectively, are a pair of ground or traction wheels 23, while the rear end of the platform *a* and its supporting framework is supported on a single ground or traction wheel 24 having its axle journaled in the lower curved back end 25 of a vertically disposed steering axle 26, which is journaled in a suitable bearing or boxing 27 secured medially of the inner face of the rear end timber or joist 18, the axle or shaft 26 being passed upwardly through an opening formed in a transversely extending stringer or sill 28 secured in position on the under face of the timber or joist 18, and provided with a fixed shoulder or collar 29 bearing against the under face thereof. A similar stringer or sill 30 is secured on the under face of the front end timber or joist 19, and the outer edges of both stringers or sills 28 and 30 are projected outwardly of the outer faces of the timbers or joists 18 anad 19, and are adapted to support all projected portions thereon, the adjacent ends of the runways *c* and *d*, respectively, as will be more fully explained herein. For supporting the platform *a* in fixed or stationary position, after the same has been moved on its ground or traction wheels 23 and 24, to desired unloading position, suitable jack devices or supports 31 are provided, and the same are supported in position at the opposite ends of the sills 28 and 30, and are preferably arranged to be folded inwardly of the framework when not in use, and, when lowered, act to raise the platform sufficiently to take the weight of the same off of the wheels thereof, substantially as is shown in Fig. 1.

The material unloading conveyor mechanism *d* is arranged at the forward or front end of the platform *a*, as hereinbefore stated, and comprises an outwardly and downwardly inclined side discharge trough 32, which is secured in position immediately inward of the front end timber or joist 19, and between the same and the inner transversely extending timber or joists 33 connecting the longitudinally extending timbers or joists 13 and 17. The lower outer discharge end of the trough 32 passes under the adjacent ends of the timbers or joists 16 and 17, as shown in Figs. 3 and 4, and is arranged to discharge into a curved housing portion 34 at the lower end of an outwardly extended conveyor frame 35, where the material is caught up by an endless belt or chain conveyor 36 trained between suitable rollers or sprockets 37 and 38 carried on shafts 39 and 40, respectively, which are journaled transversely of the lower and upper ends of the frame 35. The conveyor frame 35 is pivotally supported at its lower end on the shaft 39, which has its oppositely projected ends journaled in bracket arms 41 projecting outwardly from the rear side timber or joist 17, and is adjustable to any desirable angular inclination with respect to the platform *a* through the medium of a cable 42, which is secured at one end to the frame 35, as at 44, and is trained over a pair of sheaves or pulleys 45 and 46, carried at the opposite ends of a transversely extending bar 47 supported at a distance above the platform *a* on pairs of spaced posts 48, 48', and 49, 49', rising from the opposite corners of the front end of the latter, the posts 49, 49', however, are spaced inwardly of the forward side of the platform *a*, whereby to permit standing room for an operator to manipulate the cable 42 from this point, and mounted on these posts 49, 49', at a suitable distance from the flooring 10 of the platform is a winding shaft 50, which is journaled in bearings 51, and carries a winding drum 52, on which the free end of the cable 42 is wound and secured. The drum 52 is keyed on the shaft 50 between the posts 49, 49', and has one of its side flanges formed to provide a series of notches adapted to be engaged by a pawl or dog 53 whereby to prevent retrograde movement of the drum 52, under the strain of the weight of the conveyor frame 35, supported from the opposite end of the cable 42, the pawl or dog 53 being pivoted on the post 49 for the purpose. The shaft 50 has one end provided with a hand crank 54, by means of which the drum 52 is to be rotated for the winding and unwinding of the cable 42 thereon, and for the corresponding raising and lowering of the outer end of the conveyor frame 35 at the opposite side of the platform *a*. The posts 49, 49' are preferably braced in a direction opposed to the pulling strain of the cable 42, by means of complemental brace rods 49'', the same being secured to the upper ends of the posts by means of a bolt 47' and inclining outwardly and downwardly therefrom for secured engagement with the edge of the platform flooring 10, as at 47''. The conveyor belt or chain 36 may be of any desired form, or of a known construction, being provided with either slats, buckets, scoops or the like, depending upon the class or type of articles or material to be unloaded, and, in the present instance, slats or bars 36' are shown. The opposite ends of the shaft 40 at the upper end of the conveyor frame 35, are journaled in adjustable bearing members 55, and the desired adjustment of the same is accomplished, for varying the slack in the endless conveyor 36, through the medium of adjusting screws or bolts 56, which extend between lugs or ears 57, formed on the bearing members 55, and the angularly bent end portions 58 of a pair of bracket members 59 carried at the ends of the opposite side members of the conveyor frame 35, substantially as is shown in Fig. 8.

The discharge trough 32 extends across the front end of the platform $a$ from one side thereof, and for a distance greater than the tread of the wheels of the trucks or vehicles driven onto the platform from the inclined runway $b$, and the flooring of the platform terminates around the open sides of the trough, and to allow for the travel of the oncoming trucks or vehicles, over the trough, a floor section 60 is hinged, as at 61, to the upper end of the runway $b$ and is adapted to normally overlie the open side of the trough flush with the level of the platform floor. The runway $b$ is made up of a flooring 62 secured on timbers or joists 63, and the upper ends of the lower faces of these joists 63 are notched out, as at 64, for engagement on the projecting edge of the sill 30, and in a manner to dispose the top edge of the runway flooring flush in the plane of the upper surface of the platform flooring. Inwardly from the inner side of the trough 32, the platform flooring 10 is cut to provide a movable section 65 of a slightly greater length than that of the trough 32, and this section 65 is hinged on the line of the inner side of the latter, as at 66. After a truck or vehicle has been positioned for dumping on the platform $a$, the floor section 60, carried by the runway section $b$, and the floor section 65, are adapted to be raised to oppositely inclined positions, as shown in Fig. 1, so as to direct material discharged from the rear end of a vehicle or truck directly into the trough 32. The runway $c$ is indentically constructed as to the manner of the runway $b$, except for the hinged flooring section 60, and consists of a flooring 67 laid on the timbers or joists 67', and the upper ends of the lower edges of the latter are notched, for seating engagement on the projecting edge of the sill 28 at the rear end of the platform $a$, and the top edge of the flooring 67 is disposed flush in the plane of the platform flooring. For securing the runway $b$ in position against accidental displacement from the front end of the platform $a$, the end timber or joist 19 is provided with a pair of oppositely spaced bores or sockets 68, opening downwardly of its upper edge, as shown in Figs. 3 and 6, and which are adapted to receive the straight shanks of a pair of pivoted latching hooks 69. The top edge of the timber 19 is formed with grooves 73 which provide seats for portions of the shanks of the hooks 69, and into the said grooves 73 open the sockets 68. The hooks 69 are carried by certain of the timbers or joists of the runway $b$. The runway $c$ is secured on the rear end of the platform $a$, by means of hooks 70, which are pivoted to certain of the timbers or joists thereof, and adapted to extend through grooves 72 in the top edge of the end timber or joist 18 for such purpose, the free ends of the straight shank portions of the hooks 70 engaging in vertically extending openings or sockets 71 formed in the inner edge portion of the sill 28, as shown in Figs. 3 and 7. In both instances, the top edges of the end timbers or joists 18 and 19 are provided with the transversely extending grooves 72 and 73, respectively, to seat the hooks 69 and 70 below the plane of the surfaces thereof.

With the flooring sections 60 and 65 disposed flush with the flooring 10, of the platform, a vehicle or truck, designated $g$, is driven up the runway $b$, and onto the platform $a$, and when in proper dumping position, the forward or front wheels of the same will come to rest on a flooring section 74, forming an elevating platform for the raising of the forward end of the vehicle or motor truck $g$ into rearwardly inclined dumping position, the flooring section or elevating platform being normally disposed flush with the upper face of the platform flooring 10, and the top edge of the upper end of the flooring 67, of the runway $c$. The flooring section or elevating platform 74, is movable vertically between a pair of spaced inwardly inclined posts or trackways 75, preferably in the form of suitable lengths of T-iron, and arranged in rolling contact with the opposite sides of the central angularly disposed flanges 76, of the T-irons or rails 75, are upper and lower pairs of rollers 77, 77', which are journaled in standards 78 rising centrally of the opposite ends of the flooring section or platform 74, which standards are secured in an inclined position corresponding to the inclination of the rails 75, by means of complemental pairs of oppositely and diagonally extending brace members 79. Extending outwardly of the standards 78 are arms 80 on the free ends of which are journaled rollers 81 arranged to engage the outer flat faces of the trackways or rails 75, whereby to prevent lateral movement of the flooring section or elevating platform 74 in its up and down movements between the rails 75. The raising and lowering of the flooring section or elevating platform 74 is to be accomplished through the medium of cables 82 connecting the upper ends of the standards 78 and extending upwardly therefrom to the upper ends of the rails 75, where they are trained over sheaves or pulleys 83 and extended downwardly therefrom for connection to a suitable winding mechanism to be hereinafter more fully described. For housing the sheaves or pulleys 83, the upper end portions of the rail flanges 76 are cut away for a suitable distance from the upper ends of the base portions of the rail 75, and the free ends 84 of the latter are bent inwardly and downwardly so as to journal the rollers between the opposed faces of the overlying portions thereof.

The power transmission mechanism of the unloading apparatus consists of a main power shaft 85 journaled transversely through all of the several longitudinally extending timbers or joists of the platform framework substantially as is shown in Fig. 3, and this shaft 85 may be driven from an outside power source (not shown) at the end gear or pulley 86, or the same is to be driven, and preferably so, by the driving wheels of a motor vehicle, when the same has been placed in dumping position on the platform a. In either case, the end of the power shaft 85, opposite to that end on which the power gear or pulley 86 is keyed, is provided with a beveled gear 87 arranged in mesh with a beveled gear 88 carried on a shaft 89 journaled in bearing brackets 90, 91, 92, and 93 extending outwardly in spaced parallel relation from the outer face of the rear side timber or joist 17, as shown in Fig. 3. Keyed on the shaft 89 is a sprocket 94 which is connected, by means of a sprocket chain 95, to a sprocket complemental thereto carried on the projecting end of the lower conveyor belt shaft 39, whereby the conveyor belt or chain is driven when power is applied to the shaft 85. For taking up the slack in the sprocket chain 95, an idler roller 96 is journaled in a bracket 97 on the rear side timber or joist 17, and is positioned so as to bear against the inner side of the sprocket chain 95, substantially as is shown in Figs. 3 and 4. For utilizing the power of the driven wheels of a motor truck positioned on the platform a, a pair of properly spaced flat faced wheels or pulleys 98 are keyed on the power shaft 85, and associated with these wheels or pulleys 98 are a pair of spaced wheels or pulleys 99, which are keyed on shaft section 100 journaled between the adjacent pairs of timbers or joists 13, 14 and 15, 16, respectively, and are provided with sprockets 101 connected, by means of sprocket chains 102, to the sprockets 103 keyed on the power shaft 85.

Figure 2:
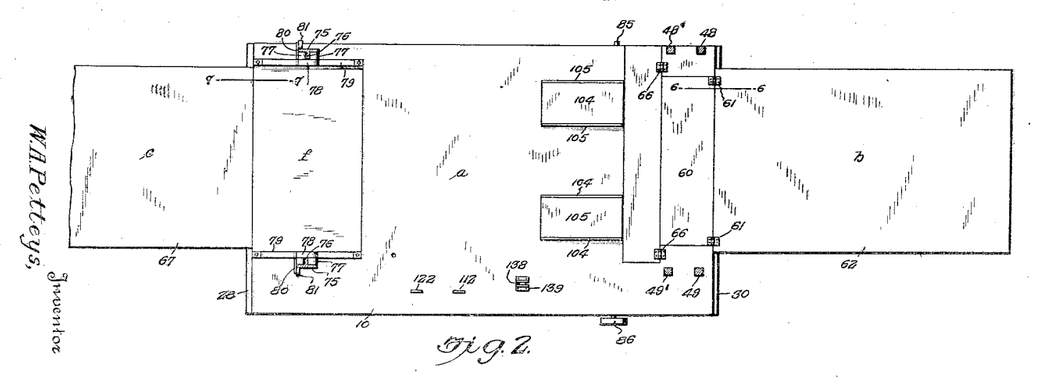
Fig. 2 is a top plan view thereof.

Each pair of complementally arranged wheels or pulleys 98, 99, are disposed immediately beneath openings formed in the flooring 10, of the platform a, directly on the line of tread of the vehicles or motor trucks g, so that, when the latter is properly positioned for the dumping of its contents, the rear driven wheels of the same will rest in rolling contact on the exposed faces of the wheels or pulleys 98, 99, substantially as is shown in Fig. 1. To facilitate the passage of the vehicle or motor truck over the openings in the flooring 10, above the wheels or pulleys 98, 99, suitable closure plates or sections 104 are slidably mounted in guide rails or pleats 105 arranged in pairs at opposite sides of the said openings, one pair being complemental to each of the same, and these closure plates 104 are normally arranged to close the openings, so that when a vehicle or truck is driven up the runway b, and onto the platform a, the front wheels thereof will pass over the plates and the rear wheels will come to rest thereon, when the plates 104 may be withdrawn from under the latter to allow for the driven wheels to drop into rolling contact with the wheels or pulleys 98, 99. For actuating the closures 104 to and from closing position over the openings in the flooring 10, of the platform a, the same are each connected by means of connecting rods 106 to the crank arms 107, of a crank shaft 108, which is journaled transversely of the under face of the framework in bearings 109, secured to the under faces of certain of the longitudinally extending timbers or joists thereof. The crank shaft 108 is operable from its forward end, terminating medially between the timbers or joists 11 and 12, at the front side of the framework of the platform a, through the medium of a crank 110 connected to an operating rod 111 projecting upwardly through the platform flooring 10, as at 112, in Fig. 2.

Figures 5, 10, 11:
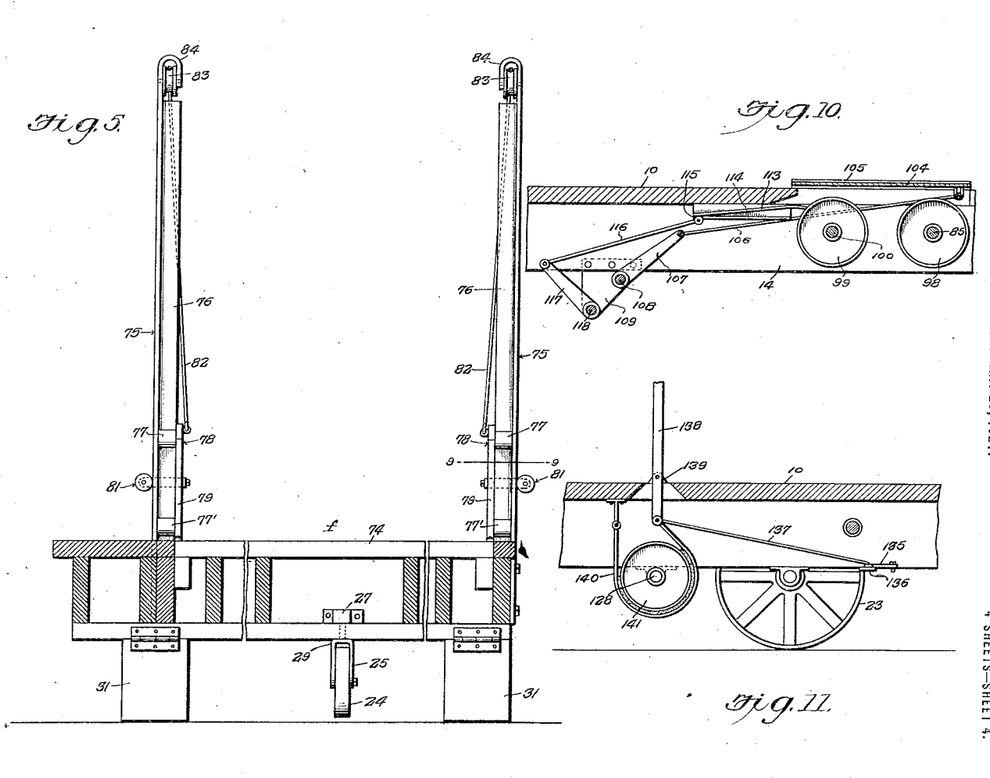

To aid the rear truck or vehicle wheels to pass out of the floor openings above the power wheels or pulleys 98, 99, a pair of flexible tread elements or shoes 113 are provided, and the same are slidably mounted in suitable casings or housings 114, positioned on the under side of the flooring 10, and immediately in rear of the longitudinal center of the openings, and these shoes are adapted to be projected from the housings 114 into positions overlying the upper periphery of the power wheels or pulleys 99, whereby to afford a gripping tread surface to the vehicle wheels. For manipulating these tread grips or shoes, the rear ends of the same are connected, as at 115, to rods 116 leading to and connecting crank arms 117 carried on a crank shaft 118, which is disposed in parallel relation to the shaft 108, and which is journaled in the bearing brackets 109 at its opposite ends, as is shown in Figs. 3 and 10. Similarly, this shaft 118 is provided at its forward end with a crank arm 119, which is connected, as at 120, to an operating arm or lever 121 extending upwardly through the platform flooring 10, as is indicated at 122, in Fig. 2. For raising and lowering the elevating platform 74, and consequently the forward end of the vehicle or motor truck positioned on the unloading platform a, the housing cables 82 are extending downwardly from the sheaves or pulleys 83, at the upper ends of the trackways or rails 75, and pass through openings formed in the platform flooring 10 to the under side of the framework, where the free ends of the same are wound on winding drums 123, keyed on a transversely extending shaft 124, which is suitably journaled in bearings secured in position on the under faces of certain of the longitudinally extending timbers or joists. This shaft 124 is to be driven through the medium of a sprocket 125, keyed thereon, and connected, by means of a sprocket chain 126, to a sprocket 127 keyed on a counter shaft 128. The counter shaft 128 is journaled transversely of the framework and in bearings secured on the under faces of the timbers or joists 12 and 15, and is driven, by means of a sprocket gearing 129, through the medium of a sprocket chain 130, from a sprocket 131 carried on a movable clutch member 132, which, in turn, is slidably keyed on the main power shaft 85. The slidable clutch member 132 is cooperative with a clutch member 133 carried by the sprocket 103, which is keyed on the main power shaft 85, as hereinbefore stated, and the clutch member 132 is to be actuated into and out of engagement with the latter through the medium of an operating rod 134 extending parallel to the main power shaft 85, and toward the front side of the platform framework, where it is pivotally connected to a bell crank lever 135, which, in turn, is pivoted in a bracket 136 secured to the under side of the timber 12, and which, in turn, is actuated by a control rod 137. The control rod 137 leads from the bell crank lever 135 and connects an operating lever 138, which extends upwardly through the flooring 10, of the platform a, and is pivoted in brackets 139 mounted on the upper face of the latter, to either side of the slotted openings in which the lever 138 is movable. This lever 138 also operates the brake band 140 encircling a brake wheel 141 carried at the forward end of the counter shaft 128, whereby to loosen up on the brake band 140 simultaneously with the moving of the clutch member 132 into operative engagement with the clutch member 133, for the free hoisting movement of the elevating platform 74, and to tighten up on the brake band 140 simultaneously with the disengaging movement of the clutch member 132, so as to regulate the lowering speed of the elevating platform 74, the lowering movement of which is accomplished by the force of gravity under the action of the weight of the elevated portion of the vehicle or motor truck on the platform. When the platform 74 has been lowered to its normal position flush with the platform flooring 10, the tread grips or shoes 113 are manipulated by the lever 121 to positions beneath the forward portions of the driven wheels of the vehicle or truck, when the latter may be driven from the platform a, across the platform 74, and down runway c to ground.

It is to be noted of the conveyor frame 35, that the same is of open construction, so as to admit of the falling through the same of any dirt or the like, when the article dumped from the vehicle or truck g into the trough 32 are in the nature of vegetables which have been freshly dug from the ground, and to prevent the articles themselves from falling through the frame, when a chain type of endless belt conveyor 36 is used, a series of spaced longitudinally extending rods or bars 35' are secured in position within the frame 35 between the opposite upper and lower sides of the conveyor belt or chain.

It is also to be noted of the vehicle or truck front end elevating mechanism thereof, that the inclination of the posts or trackways 75, and consequently of the standards 78 of the elevating platform 74, is about seventeen degrees inwardly of the vertical, and that the platform 74 therefor remains in horizontal position throughout its up and down movements.

It is well understood that, while the apparatus forming the subject matter of this case has been shown and described in a preferred assembly of parts, and in specific details and terms of construction and arrangement, various modifications of the same, changes in form and location of parts, and substitution of equivalents, may be resorted to without departing from the spirit of the invention, or from the scope of the claims appended hereto.

Having thus fully described the invention, what is claimed, is:—

1. In an apparatus for unloading non-dumping types of vehicles, a portable platform, means for elevating said platform for preventing the shifting thereof, vertical runways leading to and from the opposite ends of said platform, means at one end of said platform for elevating the front end of a vehicle for the rear dumping thereof, a trough depending from the other end of the platform adapted to receive the dumped material, a closure for the upper end of said trough, a conveyor mechanism projecting from one side of said platform and communicating with the trough for conveying the dumped material therefrom, adjustable means common to said elevating means and conveyor mechanism for operating them, and means for controlling the raising and lowering movements of said elevating means independently of the operation of said conveying means.

2. In an apparatus for unloading non-dumping types of motor vehicles, means for elevating the forward end of the vehicle for rear end dumping of the contents thereof, means for conveying the dumped material from a point in rear of the rear end of the vehicle, and means driven from the rear wheels of the motor vehicle for actuating said elevating means and said conveying means simultaneously, and means for discontinuing the elevating of the forward end of the vehicle without arresting operation of the conveying means.

3. In an apparatus for unloading non-dumping types of motor vehicles, means for elevating the forward end of a vehicle for rear end dumping of the contents thereof, means for conveying the dumped material laterally rom a point in rear of the rear end of the vehicle, means for utilizing the power of the vehicle for actuating said conveying means, means for connecting said elevating means to said power utilizing means for the raising movement of said elevating means and for disconnecting the same for the lowering movement thereof by gravity, and a brake means for retarding the lowering movement of said elevating means, said brake means being actuated by said connecting and disconnecting means and operable therewith for the said retarding action simultaneously with the disconnecting movement thereof.

4. In an apparatus of the class described, a platform, vehicle runways leading to and from the opposite ends of said platform, means at one end of said platform for elevating the front end of a motor vehicle positioned thereon to rear end dumping position, supports inclining toward one end of said platform, said supports having said elevating means traveling thereagainst, a conveyor mechanism carried at the opposite end of said platform and arranged to receive articles or material dumped from the vehicle during the elevating movement of its forward end, and means for utilizing the power of the motor vehicle for actuating the vehicle front end elevating means and said conveyor mechansm.

5. In an apparatus of the class described, a wheeled platform, means for elevating said platform and wheels thereof, detachable runways leading to and from the opposite ends of said platform, means at one end of said platform for elevating the front end of a motor vehicle positioned thereon to rear end dumping position, a conveyor mechanism carried at the opposite end of said platform and arranged to receive articles or material dumped from the vehicle during the elevating movement of its forward end, and means for utilizing the power of the motor vehicle for actuating the vehicle front end elevatng means and said conveyor mechanism.

6. An apparatus for the purpose set forth comprising a portable platform, means for elevating said platform to prevent shifting thereof, vertical runways leading to and from the opposed ends of said platform, means at one end of said platform for elevating the front end of a vehicle for rear end dumpng thereof, inclined supporting elements for said elevating means, a discharge trough depending from said platform at the other end thereof for the reception of the dumped material, a conveyor mechanism supported at one side of the platform and communicating with said trough for conveying the material dumped therein, and means common to said elevating means and conveyor mechanism for actuating them.

7. An apparatus for the purpose set forth comprising a portable platform, means for elevating said platform to prevent shifting thereof, vertical runways leading to and from the opposed ends of said platform, means at one end of said platform for elevating the front end of a vehicle for rear end dumping thereof, a discharge trough depending from said platform at the other end thereof for the reception of the dumped material, a conveyor mechanism supported at one side of the platform and communicating with said trough for conveying the material dumped therein, and means common to said elevating means and conveyor mechanism for actuating them.

8. An apparatus for the purpose set forth comprising a portable platform, means for elevating said platform to prevent shifting thereof, vertical runways leading to and from the opposed ends of said platform, means at one end of said platform for elevating the front end of a vehicle for rear end dumping thereof, inclined supporting elements for said elevating means, a discharge trough depending from said platform at the other end thereof for the reception of the dumped material, a conveyor mechanism supported at one side of the platform and communicating with said trough for conveying the material dumped therein, means common to said elevating means and conveyor mechanism for actuating them, and means for cotrolling the raising and lowering movements of said elevating means independently of the operation of said conveyor mechanism.

9. An apparatus for the purpose set forth comprising a portable platform, means for elevating said platform to prevent shifting thereof, vertical runways leading to and from the opposed ends of said platform, means at one end of said platform for elevating the front end of a vehicle for rear end dumping thereof, a discharge trough depending from said platform at the other end thereof for the reception of the dumped material, a conveyor mechanism supported at one side of the platform and communicating with said trough for conveying the material dumped therein, and means common to said elevating means and conveyor mechanism for actuating them, and means for controlling the raising and lowering movements of said elevating means independently of the operation of said conveyor mechanism.

10. An apparatus for the purpose set forth comprising a portable platform, means for elevating said platform to prevent shifting thereof, vertical runways leading to and from the opposed ends of said platform, means at one end of said platform for elevating the front end of a vehicle for rear end dumping thereof, a discharge trough depending from said platform at the other end thereof for the reception of the dumped material, a conveyor mechanism supported at one side of the platform and communicating with said trough for conveying the material dumped therein, means common to said elevating means and conveyor mechanism for actuating them, and means for directing the material during the dumping thereof into said trough.

In testimony whereof, I affix my signature hereto.

WILLARD A. PETTEYS.